United States Patent
Sutherland

(10) Patent No.: US 8,035,244 B2
(45) Date of Patent: Oct. 11, 2011

(54) IMPULSE ROTOR GENERATOR

(75) Inventor: Michael T. Sutherland, Calgary (CA)

(73) Assignee: Kismet Engineering Inc. (CA)

( * ) Notice: Subject to any disclaimer, the term of this patent is extended or adjusted under 35 U.S.C. 154(b) by 501 days.

(21) Appl. No.: 12/301,848

(22) PCT Filed: May 31, 2007

(86) PCT No.: PCT/CA2007/000958
§ 371 (c)(1),
(2), (4) Date: Nov. 21, 2008

(87) PCT Pub. No.: WO2007/137424
PCT Pub. Date: Dec. 6, 2007

(65) Prior Publication Data
US 2010/0237624 A1    Sep. 23, 2010

Related U.S. Application Data

(60) Provisional application No. 60/809,352, filed on May 31, 2006.

(51) Int. Cl.
*F03B 13/00* (2006.01)
(52) U.S. Cl. ............................................ 290/54; 290/43
(58) Field of Classification Search .............. 290/42–43, 290/52–54
See application file for complete search history.

(56) References Cited

U.S. PATENT DOCUMENTS

| | | | | |
|---|---|---|---|---|
| 3,342,267 | A * | 9/1967 | Cotter et al. ..................... | 166/60 |
| 3,840,080 | A * | 10/1974 | Berryman ..................... | 175/107 |
| 3,867,655 | A * | 2/1975 | Stengel et al. .................. | 310/66 |
| 4,276,482 | A * | 6/1981 | Crockett ......................... | 290/52 |
| 4,369,373 | A * | 1/1983 | Wiseman ......................... | 290/2 |
| 4,491,738 | A * | 1/1985 | Kamp .............................. | 290/43 |
| 4,520,273 | A * | 5/1985 | Rowe .............................. | 290/54 |
| 4,720,640 | A * | 1/1988 | Anderson et al. ............... | 290/43 |
| 4,740,711 | A * | 4/1988 | Sato et al. ....................... | 290/52 |
| 5,248,896 | A  | 9/1993 | Forrest | |

(Continued)

FOREIGN PATENT DOCUMENTS

CA    1177513    11/1984

(Continued)

OTHER PUBLICATIONS

International Search Report for PCT/CA2007/000958.

(Continued)

*Primary Examiner* — Thanh Lam
(74) *Attorney, Agent, or Firm* — Caesar, Rivise, Bernstein, Cohen & Pokotilow, Ltd.

(57) ABSTRACT

An impulse rotor generator is provided for generating power in response to a primary mud flow in a drill string. The generator comprises a power rotor, at least one stationary magnetic pickup, and a pickup coil mounted on the at least one stationary magnetic pickup. The power rotor is positioned at least in part in the primary mud flow and is rotatable in response to the primary mud flow, the power rotor having an axis of rotation that is transverse to said primary mud flow. The power rotor is provided with a plurality of magnets affixed thereto, the magnets being arranged so as to magnetically couple with the at least one stationary magnetic pickup. Upon rotation of the power rotor in response to the primary mud flow, a current is produced in the pickup coil mounted on the at least one stationary magnetic pickup.

20 Claims, 9 Drawing Sheets

U.S. PATENT DOCUMENTS 5,839,508 A     11/1998  Tubel et al.
6,518,680 B2 *  2/2003   McDavid, Jr. .................. 290/54
6,672,409 B1    1/2004   Dock et al.
6,848,503 B2    2/2005   Schultz

FOREIGN PATENT DOCUMENTS

GB    2412017    9/2005
WO    2007/094685 A    8/2007

OTHER PUBLICATIONS

Extended European Search Report issued Jun. 16, 2009 (6 pages) for corresponding EP Application No. 07719877.8.

* cited by examiner

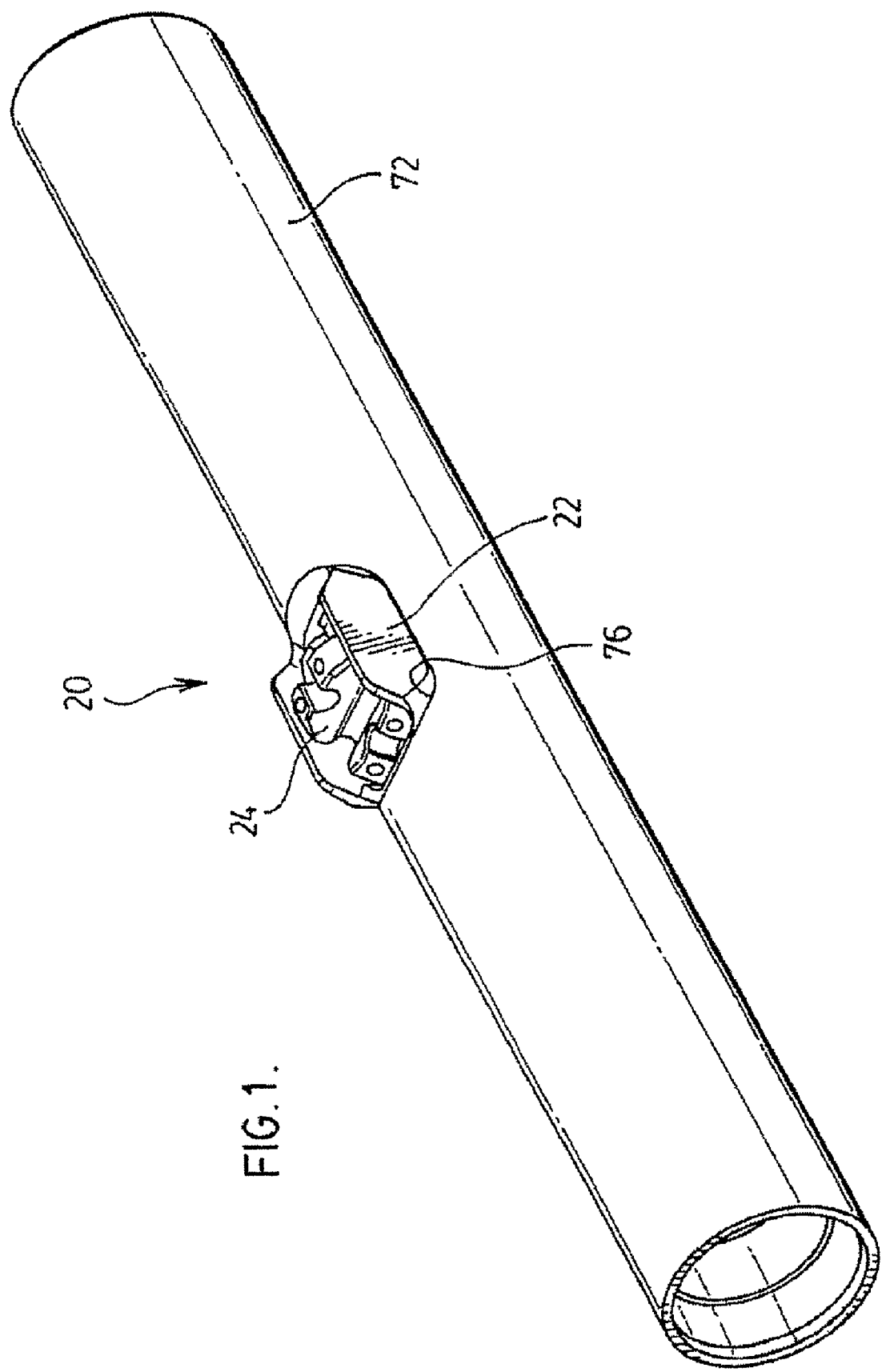

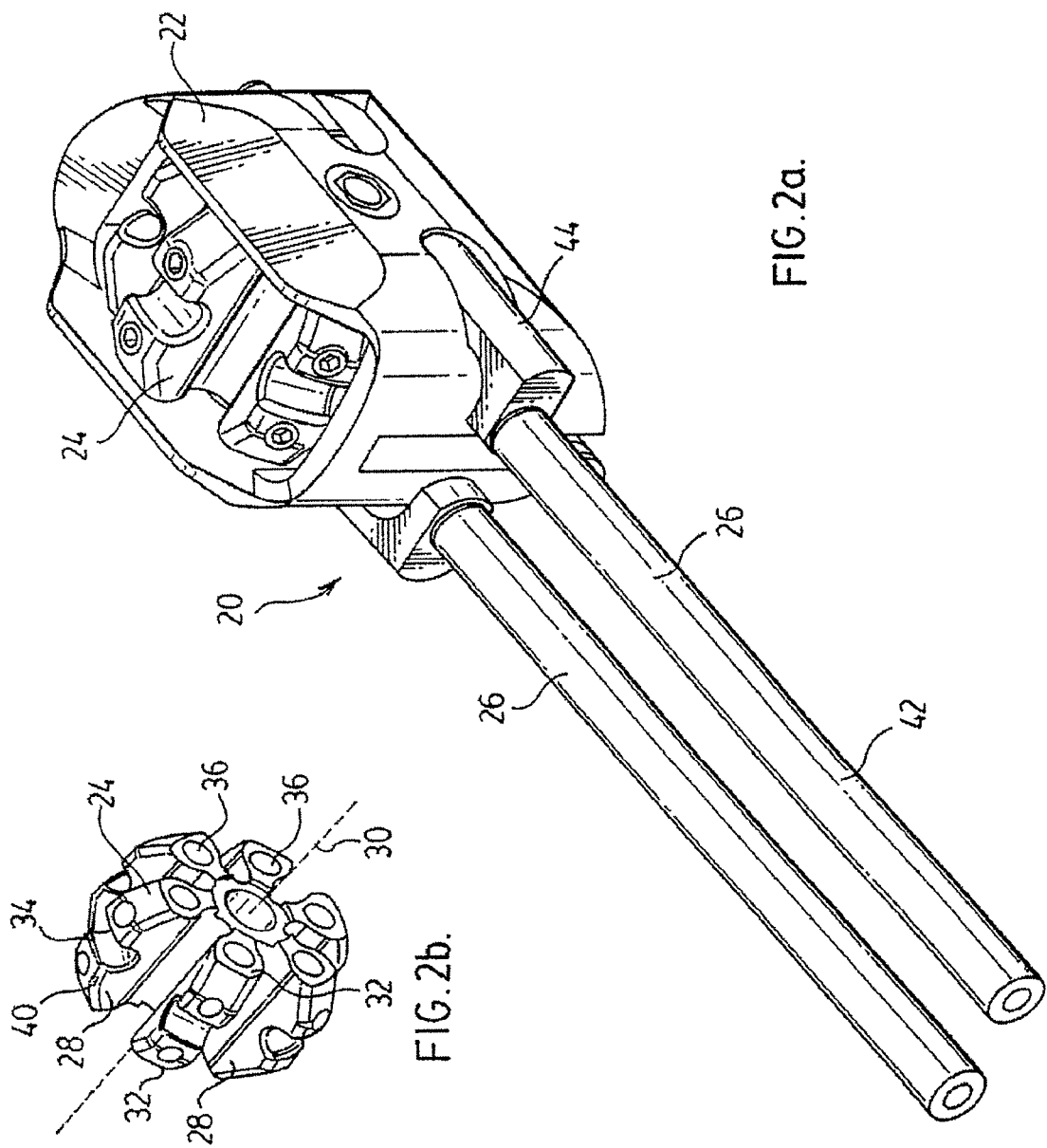

IMPULSE ROTOR GENERATOR

FIELD OF THE INVENTION

The present invention generally relates to the field of directional drilling, and in particular to an impulse rotor generator that generates electricity in response to the flow of drilling mud during a drilling operation.

BACKGROUND OF THE INVENTION

Directional drilling has dramatically changed the landscape of large-scale drilling operations. In common practice today are both the Logging-While-Drilling (LWD) and Measurement-While-Drilling (MWD) configurations, each permitting enhanced control, monitoring and information collection with respect to the subject formation.

With LWD and MWD, a wide range of measurements of formation properties are made during the drilling operation. Examples of properties measured include, but are not limited to resistivity, porosity, sonic velocity, gamma ray levels, as well as pressure and temperature of the well bore. Moreover, MWD permits the measurement of well bore trajectory using a range of detectors such as accelerometers and magnetometers. With the use of telemetry technologies including mud pulse and electromagnetic (EM) telemetry, the data is sent back to the surface to the operators. With this information, the operator is able to accurately guide a drill string to a predetermined target.

Directional drilling provides many advantages over more conventional drilling methodologies. In particular, directional drilling provides a more environmentally conscience approach to drilling as it minimizes surface disruptions by requiring a much smaller footprint on a given drill site. So versatile is directional drilling that well sites can be located outside of an environmentally sensitive or protected area. Directional drilling also makes it possible to expand upon existing vertical wellbores by drilling laterally away to offset targets, thereby maximizing production from a single formation.

As can be appreciated, with the incorporation of electronics in the tool string, power supply issues plague the industry. Various solutions have been presented, with the more conventional approaches using surface-based wire-line electrical connections as well as the incorporation of batteries (i.e. lithium-thionylchloride) into the downhole tool-string. Each of these power supplies has its shortcomings, whether it is safety, stability, durability or overall cost.

Alternate power generation methodologies have been developed and implemented to varying degrees of success. In particular, a number of power generators have been developed which are based on harnessing the flow of drilling mud to rotate a downhole power generator. An example of this technology includes U.S. Pat. Nos. 5,839,508 and 6,672,409.

U.S. Pat. No. 5,839,508 pertains to an electrical generating apparatus which connects to the production tubing of a drilling operation. In a preferred embodiment, this apparatus includes a housing having a primary flow passageway in communication with the production tubing. The housing also includes a laterally displaced side passageway communicating with the primary flow passageway such that production fluid passes upwardly towards the surface through the primary and side passageways. A flow diverter may be positioned in the housing to divert a variable amount of production fluid from the production tubing and into the side passageway. An electrical generator is located at least partially in or along the side passageway. The electrical generator generates electricity through the interaction of the flowing production fluid.

In U.S. Pat. No. 6,672,409, a generator assembly for generating power in the downhole end of a drill string is disclosed. The drill string provides a fluid passageway in which a downhole generator is positioned so as to subject a rotatable turbine to a pressurized fluid flowing in the fluid passageway, thereby imparting a mechanical rotation to the turbine. The turbine is coupled to a generator so that the mechanical rotation of the turbine is transferred to a power output of the generator.

In use, many of the prior art methodologies for generating power downhole are limited by various deficiencies and/or drawbacks. Problems encountered include, for example, safety issues, mechanical complexity and durability, as well as overall cost. As a result, there is an ongoing demand for alternatives to the aforementioned technologies that offer improved performance, greater reliability as well as reduced complexity and overall cost.

SUMMARY OF THE INVENTION

According to an aspect of an embodiment, there is provided an impulse rotor generator for generating power in response to a primary mud flow in a drill string. The generator includes a power rotor, at least one stationary magnetic pickup, and a pickup coil mounted on the at least one stationary magnetic pickup. The power rotor is positioned at least in part in the primary mud flow and is rotatable in response to the primary mud flow. The power rotor has an axis of rotation that is transverse to the primary mud flow. The power rotor is provided with a plurality of magnets affixed thereto, the magnets being arranged so as to magnetically couple with the at least one stationary magnetic pickup. Upon rotation of the power rotor in response to the primary mud flow, a current is produced in the pickup coil mounted on the at least one stationary magnetic pickup.

According to another aspect of an embodiment, there is provided an impulse rotor generator for generating power in response to a primary mud flow in a drill string. The generator includes a pressure barrel dimensioned to form an annulus between the generator and the drill string, the annulus permitting the passage of the primary mud flow. Located at least in part in the pressure barrel is a power rotor, the power rotor being rotatable about an axis transverse to the longitudinal axis of the pressure barrel. The power rotor extends at least in part in the annulus, so as to rotate in response to the primary mud flow. The power rotor is configured with a plurality of magnets affixed thereto; the plurality of magnets being arranged to magnetically couple with at least one adjacently positioned stationary magnetic pickup. The stationary magnetic pickup has mounted thereon a pickup coil in which a current is generated in response to rotation of the power rotor relative to the stationary magnetic pickup.

The current created as a result of the magnetic coupling between the power rotor and the at least one stationary magnetic pickup is subsequently directed to a voltage conditioner for conversion into a suitable DC service at a voltage required by the tool string.

BRIEF DESCRIPTION OF THE DRAWINGS

Embodiments of the present application will now be described, by way of example only, with reference to the attached Figures, wherein FIG. 1 is a perspective view of one embodiment of the assembled impulse rotor generator;

FIG. 2a is partial perspective view of the embodiment of FIG. 1 showing the rotor frame and power rotor assembly with two stationary magnetic pickups in position;

FIG. 2b is a perspective view of the embodiment of FIG. 1 showing the power rotor for use in the impulse rotor generator;

DETAILED DESCRIPTION OF THE PREFERRED EMBODIMENTS

Figure 2C:
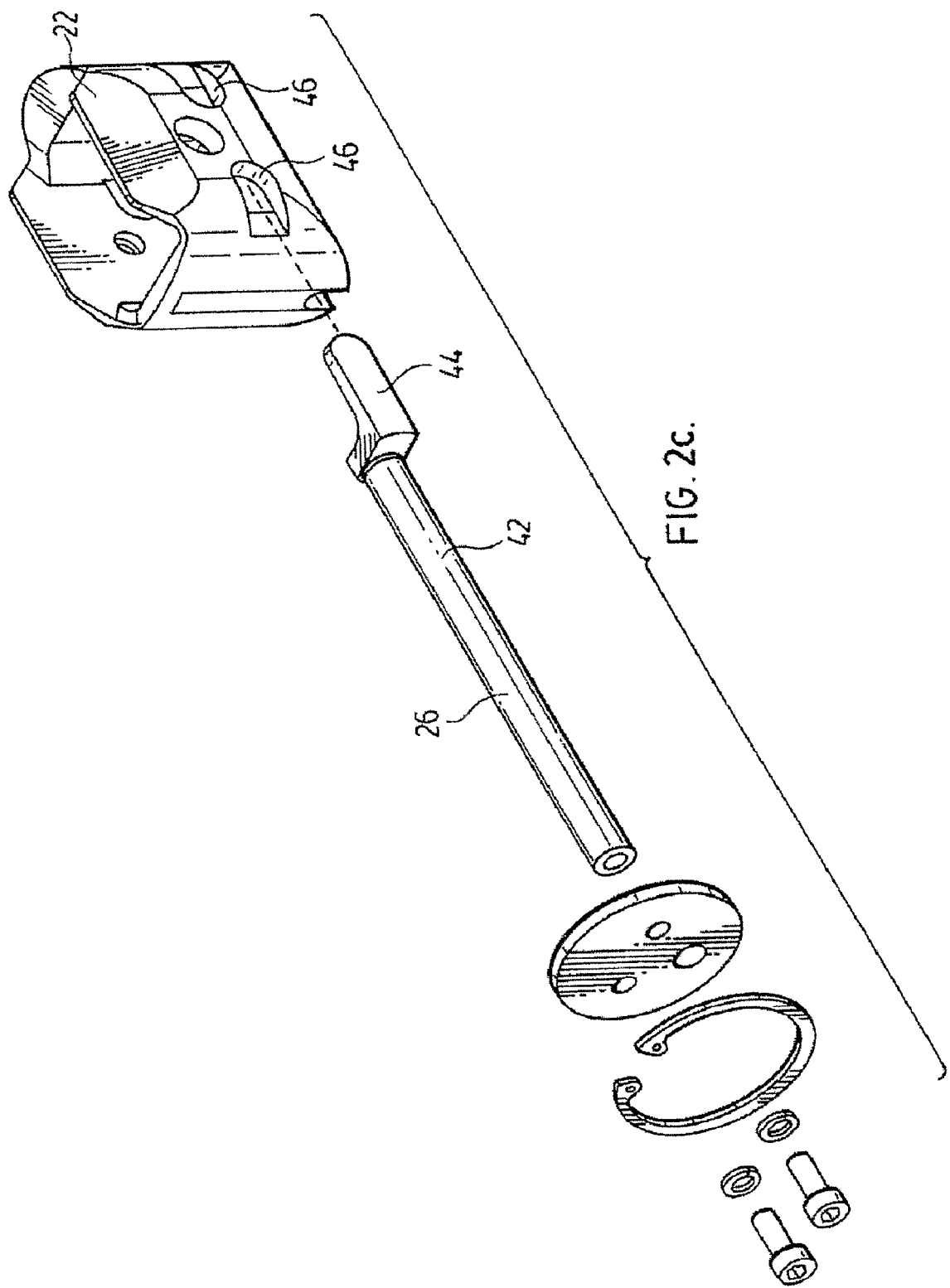
FIG. 2c is a partial exploded view of the embodiment of FIG. 1 showing the relationship between the rotor frame and the stationary magnetic pickup.

Referring to FIG. 1, shown is an assembled impulse rotor generator as indicated generally by reference numeral 20. In operation, the impulse rotor generator is incorporated into a tool-string, preferably in the general vicinity of downhole demand points (i.e. MWD and telemetry electronics).

Referring now to FIG. 2a, the generator 20 includes a rotor frame 22, a power rotor 24 rotatably mounted in the rotor frame 22, and at least one stationary magnetic pickup 26. In the embodiment shown, each end of the rotor frame 22 is configured to receive two stationary magnetic pickups 26 (only two shown for clarity). Shown separated from the rotor frame 22 in FIG. 2b, the power rotor 24 is comprised of a plurality of paddle segments 28 extending radially from a central axis 30, each paddle segment 28 being dimensioned with opposing side sections 32 and a mud-flow contact region 34. In the embodiment shown in FIGS. 2a and 2b, the power rotor 24 is comprised of six paddle segments 28.

Each paddle segment 28 has positioned therein either a rod-shaped magnet 36 that extends between each opposing side section 32, or alternatively, two shorter rod-shaped magnets with a magnetically permeable material (i.e. Carpenter Stainless Type 430F—Solenoid Quality) placed there-between. The magnet 36 on each paddle segment 28 is situated so as to magnetically engage or couple the stationary magnetic pickups 26 upon rotation of the power rotor 24. Each end face of the rod-shaped magnet 36 on each paddle segment 28 is flush or slightly recessed relative to each opposing side section 32 so as to reduce wear and reduce the likelihood of obstruction upon rotation of the power rotor 24. In the present embodiment, the magnet 36 is a rare earth magnet (i.e. neodymium iron boron or samarium cobalt). Each paddle segment 28 is also provided with a replaceable wear strip 40 in the mud-flow contact region 34, thereby extending the life of the power rotor 24. The material for wear strip 40 is chosen in accordance with a required durability depending on the characteristics of the formation being drilled. As such, the operator is able to increase the duration of service between scheduled maintenance stoppages, an important factor with respect to operational costs.

The stationary magnetic pickup 26 includes an elongate shaft 42 and a terminal offset foot 44. As shown in FIG. 2c, the offset foot 44 is configured to slide into a corresponding recess 46 in the rotor frame 22. The offset foot 44 of the stationary magnetic pickup 26 cooperates with the magnet 36 located on each paddle segment 28 to generate electricity, as will be described below.

Figure 3A:
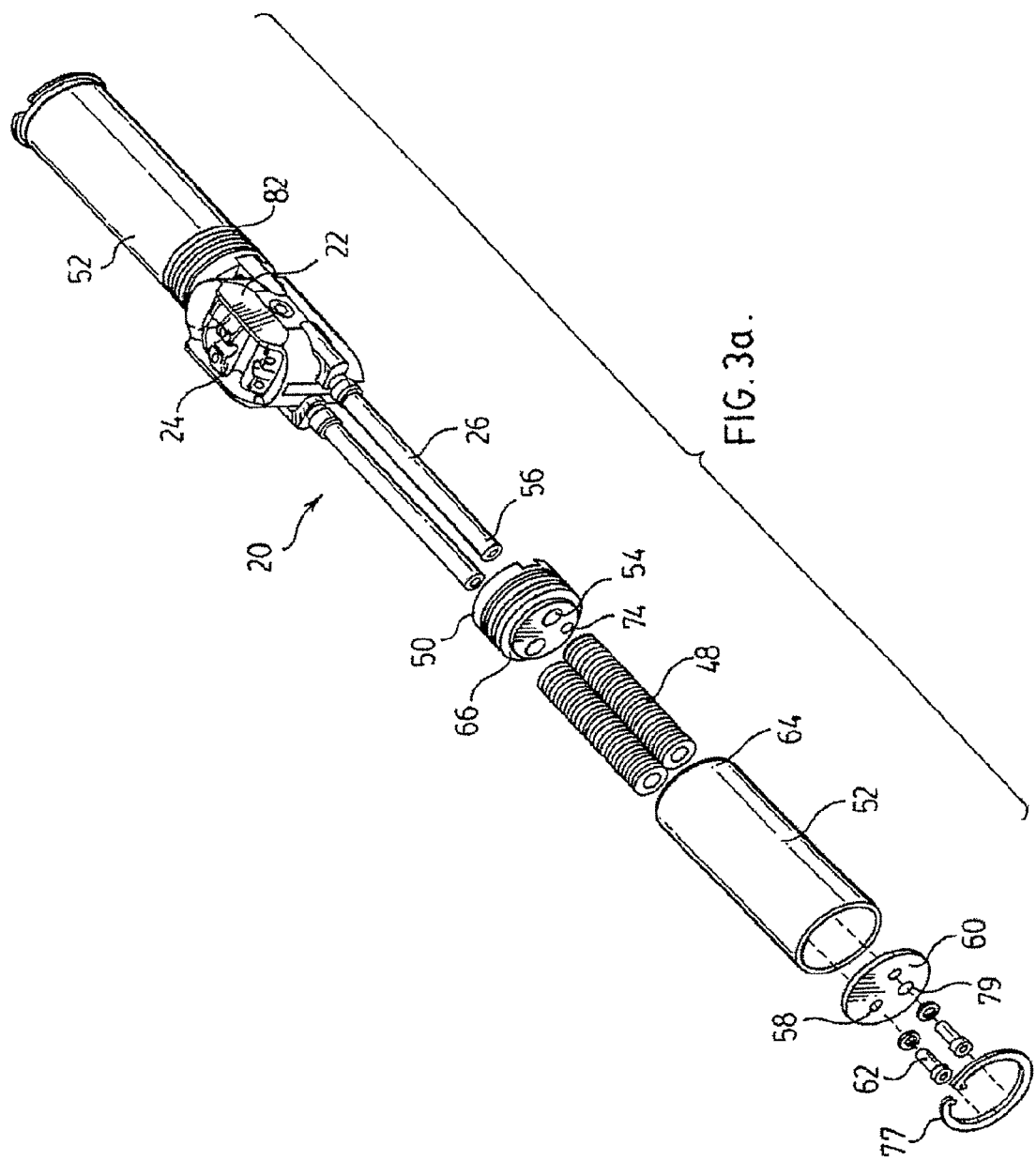
FIG. 3a is a partial exploded view of the embodiment of FIG. 1 showing the general assembly of the impulse rotor generator.
Figure 3B:
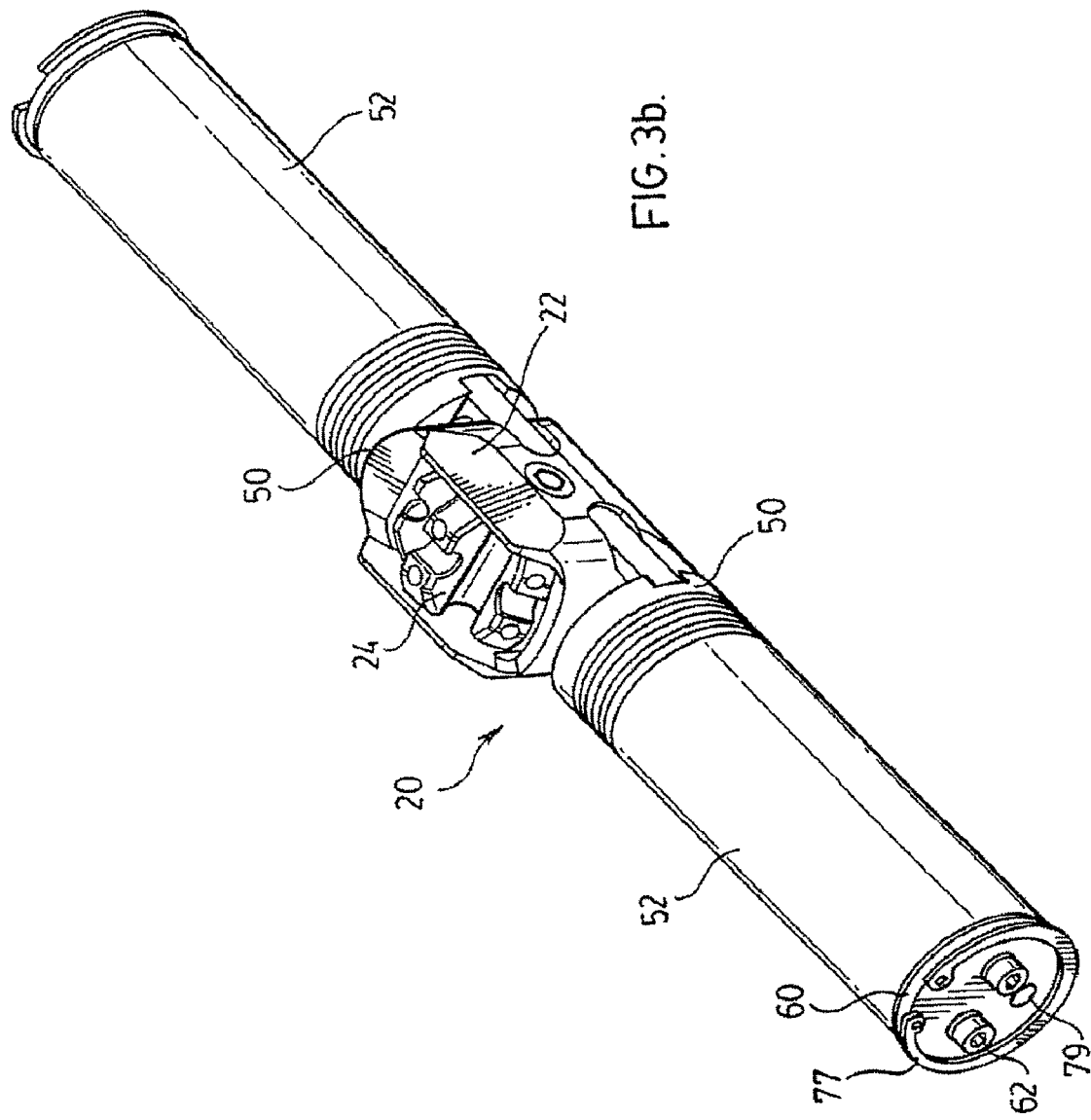
FIG. 3b is a partial perspective view of the embodiment of FIG. 1 without the protective pressure barrel.
Figure 7:
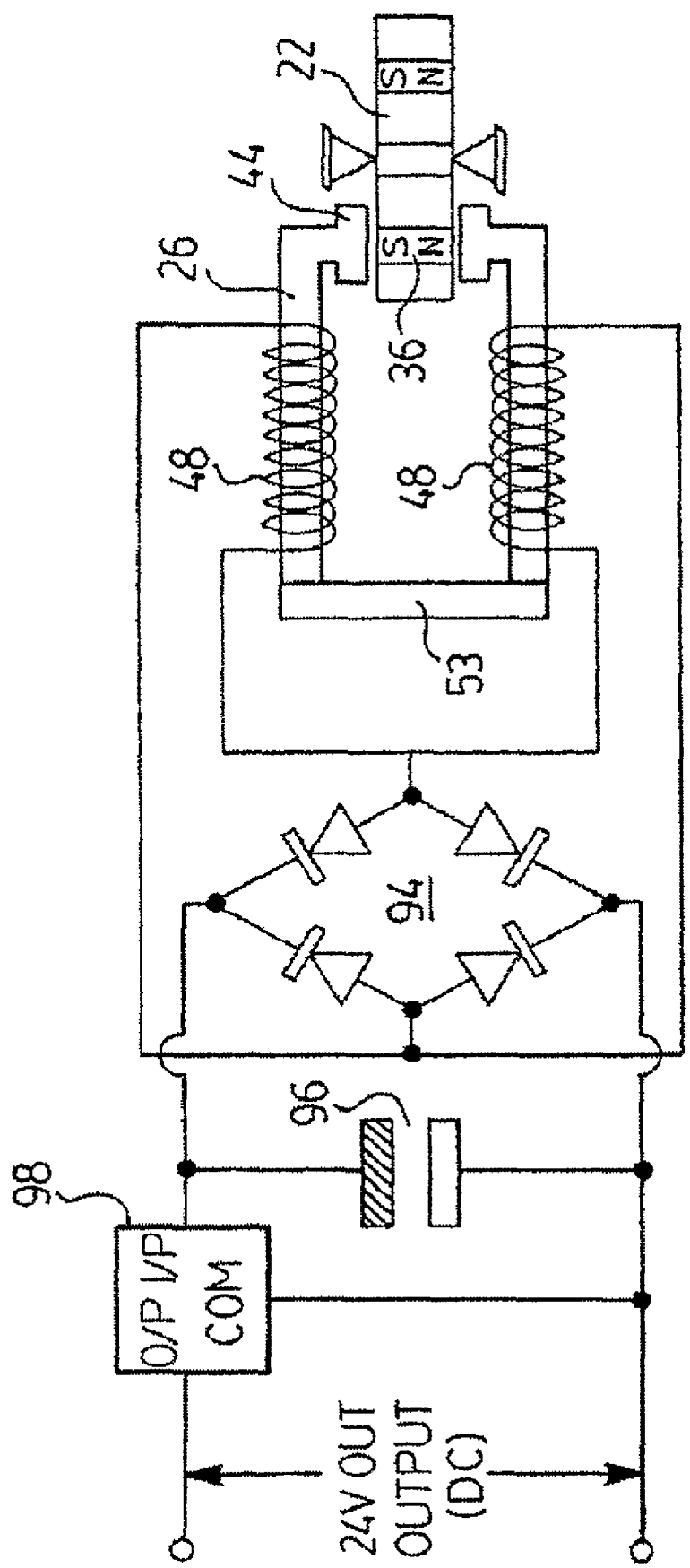
FIG. 7 is a schematic representation of the embodiment of FIG. 1.

For the purpose of generating electricity, each stationary magnetic pickup 26 is provided with a pickup coil 48, as shown in the exploded view of FIG. 3a. To encase and provide protection to the pickup coils 48, a stator bulkhead 50 and circuit canister 52 are positioned over the stationary magnetic pickups 26. To enable the stator bulkhead 50 to be slidably positioned along the stationary magnetic pickups 26, the stator bulkhead 50 includes longitudinal bores 54. With the stator bulkhead 50 and circuit canister 52 in position, a portion of each distal end 56 of the stationary magnetic pickups 26 passes through corresponding holes 58 in the canister end cap 60. Suitable fasteners (e.g. bolts, nuts, etc. . . . ) cooperating with the protruding distal end 56 of the stationary magnetic pickups 26 maintain the circuit canister 52 in position, as shown in FIG. 3b. In the embodiment shown, socket head cap screws 62 are used to maintain the canister end cap 60 and circuit canister 52 in position, while registration relative to the stator bulkhead 50 is facilitated by locating the stator end 64 of the circuit canister 52 in a circumferential groove 66 on the stator bulkhead 50. As shown, the canister end cap 60 is further provided with a port 79 to permit channelling of wires to and from adjacently positioned drill string components. The stationary magnetic pickup and the canister end cap are made of a magnetically permeable material (i.e. Carpenter Stainless Type 430F—Solenoid Quality), thereby upon assembly, a magnetic bridge 53 is established between adjacently positioned stationary magnetic pickups 26, as shown in FIG. 7.

In addition to protecting the pickup coils 46, the circuit canister 52 may be used as a load bearing element to prevent the stator bulkhead 50 from being pushed under pressure into the region of the pickup coils 46. The material chosen for the circuit canister may be any suitable material used in drilling, such as aluminium or stainless steel, and is preferably able to withstand load pressures as high as 10,000 pounds per square inch (psi) or greater.

Figure 4:
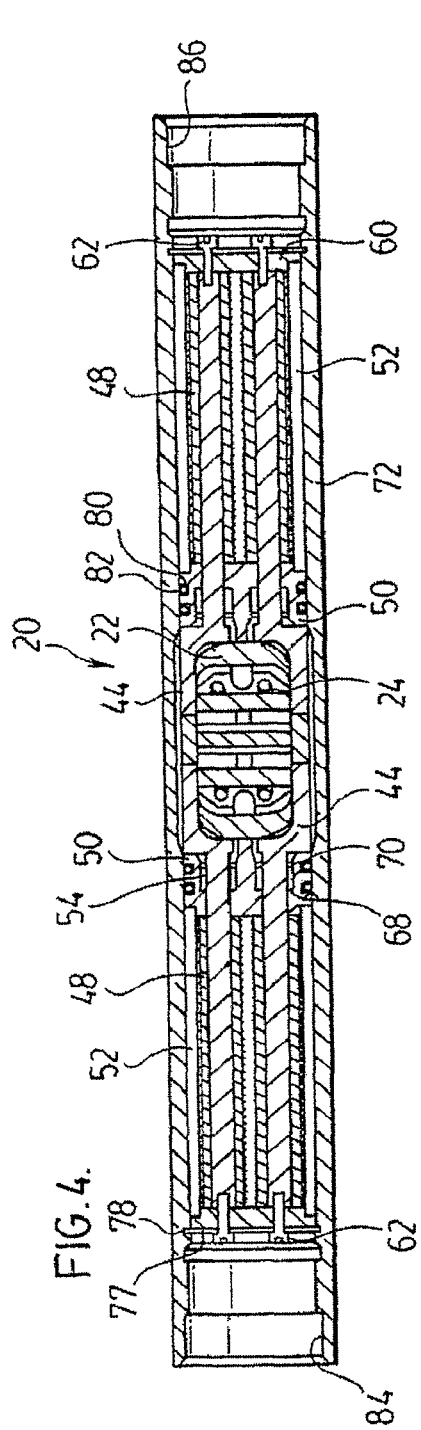
FIG. 4 is a top-facing cross-sectional view of the embodiment of FIG. 1.

Referring now to FIG. 4, to inhibit the ingress of drilling mud into the region of the pickup coils 48, the inside surface of each longitudinal bore 54 of stator bulkhead 50 is provided with at least one circumferential groove 68 for placement of a suitable o-ring 70. With this arrangement, mud present in the region of the power rotor 24 and rotor frame 22 is inhibited from passing into the region of the pickup coils 48.

To shield the above described assembly from the flow of abrasive drilling mud, the assembly is contained within a pressure barrel 72. During assembly, the components adjacent each side of the rotor frame 22 are preassembled and partially inserted into each end of the pressure barrel 72. Since the wires from the four pickup coils 48 are directed to one side of the impulse rotor generator 20, wires requiring passage around the rotor frame 22 are directed at this time through bore 74 (See FIG. 3a) in the stator bulkheads 50, and conduit 75 (See FIG. 5) of the rotor frame 22. Once the components adjacent each side of the rotor frame 22 are partially inserted, the power rotor 24 and frame 22 is assembled and placed into position through an opening 76 (See FIG. 1) in the pressure barrel 72. With the rotor frame 22 and contained power rotor 24 in position, the stationary magnetic pickup 26 and associated canister assembly is moved into position with the offset foot 44 of each stationary magnetic pickup 26 engaging the respective recess 46 of the rotor frame 22. To facilitate this process, the stationary magnetic pickup 26 and associated canister assembly is kept loosely assembled so as to permit the offset foot 44 of each pickup 26 to be rotated until each registers within the respective recess 46 of the rotor frame 22. Once assembled, the rotor frame 22 is locked into position by way of the offset foot 44 of each stationary magnetic pickup 26. At this point, the fasteners 62 can be tightened. To maintain the stationary magnetic pickups 26 and the accompanying circuit canisters 52 in position relative to the rotor frame 22, a suitable fastener is used at each end of the pressure barrel 72. In the embodiment shown, a c-clip 77 (See FIGS. 3b and 4) is used in concert with a corresponding circumferential groove 78 on the inside surface of the pressure barrel 72.

As shown in FIG. 4, the stator bulkheads 50 are also supplied with circumferential grooves 80 on the outside surface so as to permit a seal between the stator bulkhead 50 and the pressure barrel 72. With the placement of O-rings 82 within these grooves, the ingress of drilling mud into the region of the pickup coils 48 is further inhibited. A similar seal arrangement is provided for the conduit 75 in the stator bulkhead 50 wherein circumferential grooves and o-rings are used to inhibit ingress of mud from the region of the power rotor 24 into the region of the pickup coils 48.

Figure 5:
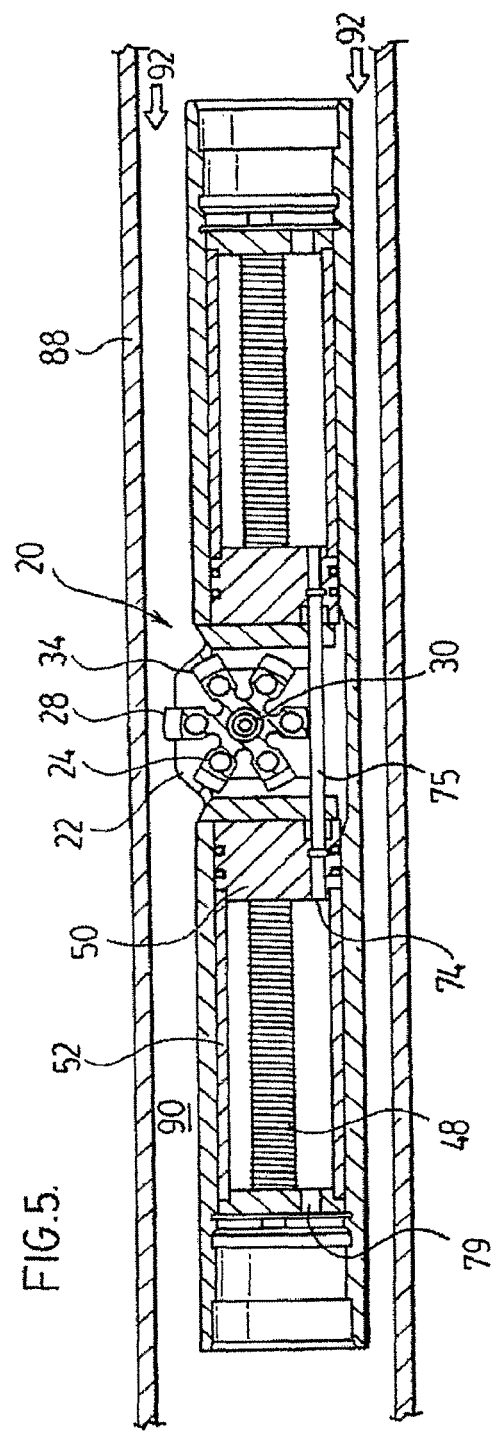
FIG. 5 is a side-facing cross-sectional view of the embodiment of FIG. 1 showing the placement of the impulse rotor generator in a drill string.

As mentioned previously, the impulse rotor generator 20 is inserted into a tool string at a downhole location in relative proximity to the demand points (i.e. electronics). To enable the insertion of the impulse rotor generator 20 into the tool string, each end 84, 86 of the pressure barrel 72 is configured with appropriate attachment facings as would be familiar to one skilled in the art. In addition, these facings may be provided with suitable seals (e.g. circumferential grooves and o-rings, etc. . . . ) to prevent ingress of mud and debris, as would also be familiar to one skilled in the art. Once placed into a tool string, the impulse rotor generator 20 remains generally centralized relative to the drill string 88, thus forming an annulus 90 around the tool, as represented in FIG. 5.

The annulus 90 around the impulse rotor generator 20, as well as around the other tool modules in the tool string permit the flow of drilling mud down through the drill string. The impulse rotor generator 20 uses this primary mud flow 92 to rotate the power rotor 24, thereby generating power in a manner described below. To facilitate the rotation of the power rotor 24, the power rotor 24 is positioned such that the axis of rotation 30 is transverse to the primary mud flow 92. In addition, the power rotor 24 is mounted such that the mud flow contact region 34 extends at least in part into the annulus 90. With this configuration, drilling mud flowing through the annulus 90 impacts upon the paddles 28 of the power rotor 24 in the vicinity of the mud flow contact region 34, causing the power rotor 24 to rotate about the transverse axis 30.

Figure 6:
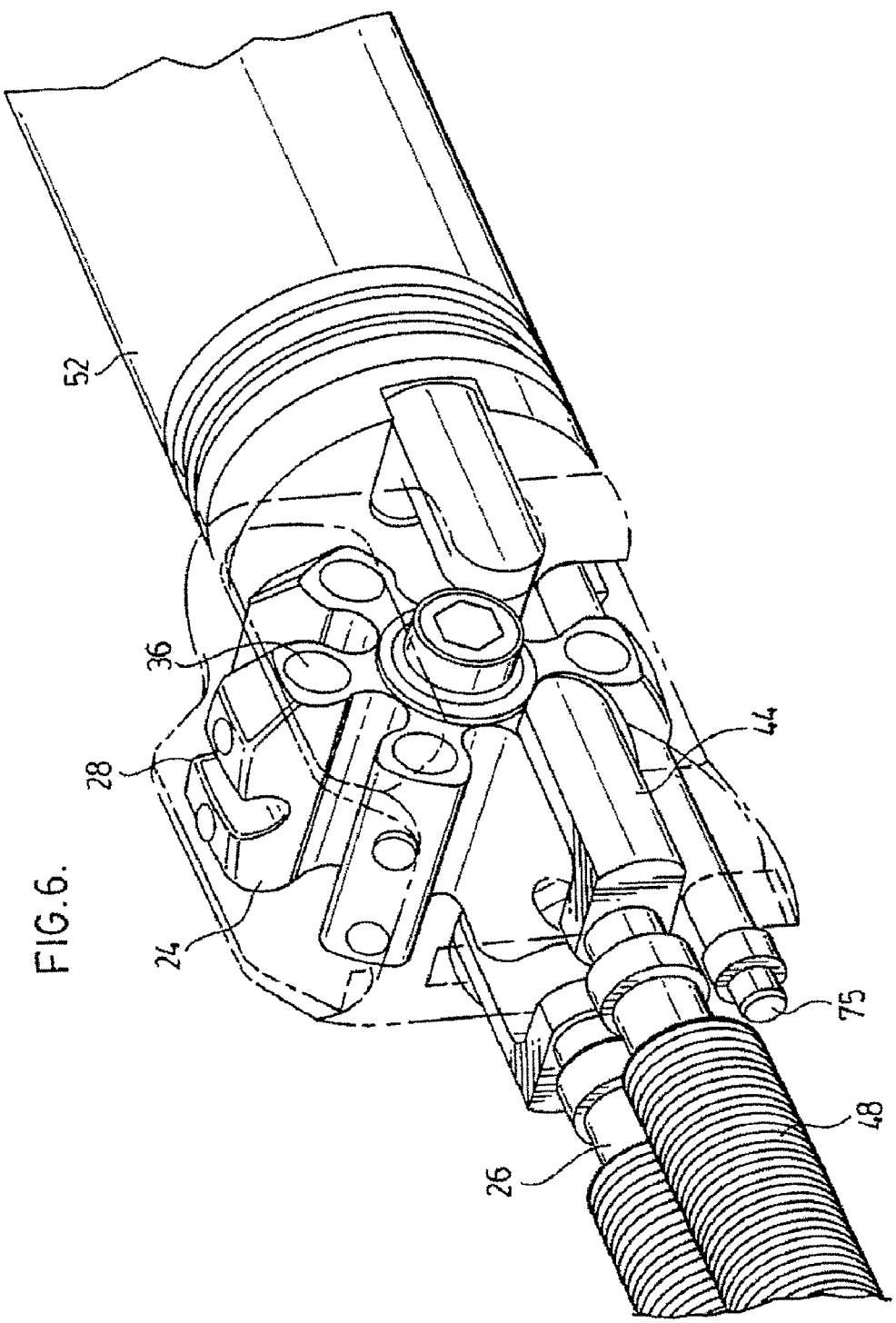
FIG. 6 is a partial perspective view of the embodiment of FIG. 1 detailing the rotor frame and power rotor assembly.

Upon rotation of the power rotor 24, each magnet 36 mounted on respective paddle segments 28 of the power rotor 24 passes in close proximity to the offset foot 44 of the stationary magnetic pickup 26, as shown in FIG. 6. The proximity is such that the magnet 36 is able to magnetically engage or couple with the stationary magnetic pickup 26. To propagate the magnetic field, the stationary magnetic pickups 26 and canister end cap 60 are made of a magnetically permeable material (i.e. Carpenter Stainless Type 430F—Solenoid Quality). As such, a current flow is created in the pickup coil 48 mounted on each stationary magnetic pickup 26. In the embodiment shown in FIG. 7, this current flow is then directed from each pickup coil 48 through a bridge rectifier 94, a capacitor 96 and step-up DC/DC regulator 98 for conversion into a suitable DC service at a voltage required by the tool string. It will be appreciated that one skilled in the art may choose to implement an alternate method for voltage conditioning suitable for a particular demand or application. As shown in FIG. 7, the pickup coils 48 are positioned in parallel relative to the bridge rectifier 94. With this arrangement, a failure in any one pickup coil does not completely incapacitate the generator.

As mentioned in the background, the incorporation of electronics into the tool string has created a number of power supply issues. A typical MWD tool assembly requires approximately 120 W to operate. While the generator can be configured to achieve a range of power outputs (i.e. by altering the number of paddle segments per rotor), in one particular example, the maximum rotation of the power rotor is approximately 6000 rpm without load, and approximately 1750 rpm at 60 W output. With a 60 W power output, the incorporation of 2 or even 3 impulse rotor generators are required to meet the demand. Although the use of multiple units (i.e. 2 or more) may be common for any one tool string, the simplicity of the construction leads to substantial cost savings (i.e. as low as $\frac{1}{5}^{th}$ the cost of prior art turbine-based systems). The durability and stability of the impulse rotor generator also leads to substantial savings with respect to operational costs (i.e. as low as $\frac{1}{10}^{th}$ the cost of prior art systems). By substantially reducing the costs of the power generators, and with the capacity to operate multiple units in any one tool string, the ability to introduce a certain degree of power redundancy is possible. This ensures sufficient power supply, even in the event of a failure in any one power unit.

Figure 8:
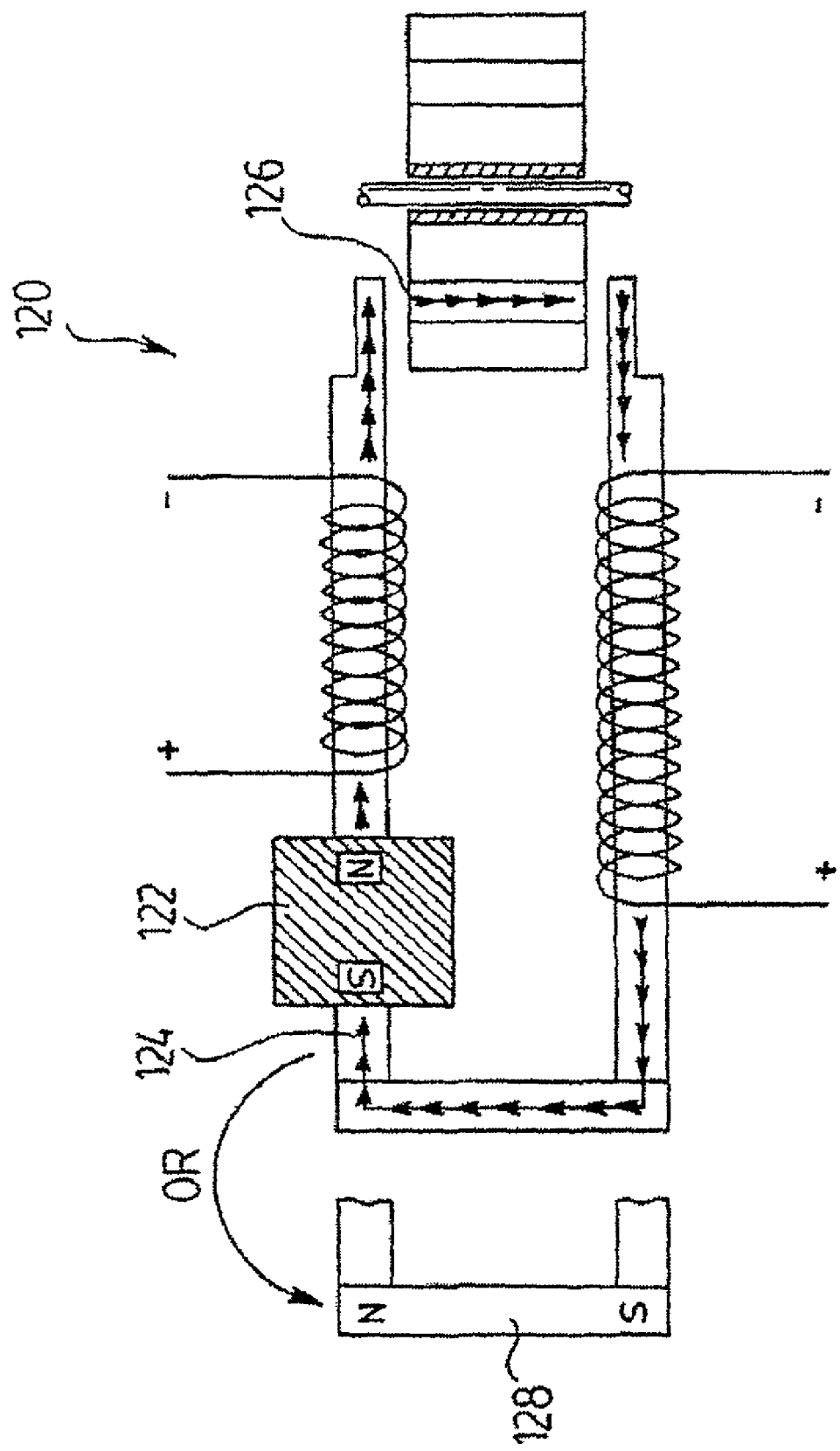
FIG. 8 is a partial schematic of an alternate embodiment of the impulse rotor generator.

In an alternate embodiment of the impulse rotor generator 120, the magnet 122 is moved from the power rotor to the magnetically permeable stationary magnetic pickup 124 as shown in FIG. 8. In this configuration, the magnet 122 is stationary and a magnetically permeable material 126 (i.e. ferrite or Carpenter Stainless Type 430F—Solenoid Quality) spans the power rotor in place of the rod-shaped magnet. The stationary magnet 122 is located in either the stationary magnetic pickup 124, or positioned as a magnetic bridge 128. In use, this alternate embodiment operates in much the same manner as described above.

It will be appreciated that, although embodiments of the impulse rotor generator have been described and illustrated in detail, various modifications and changes may be made. While one embodiment is described above, some of the features described above can be modified, replaced or even omitted. For example, the rare-earth magnets used in the paddle segments can be substituted with alternate magnetic materials including but not limited to Alnico, ceramic or ferrite. Centering the tool string containing one or more impulse rotor generators relative to the larger diameter drill string can be facilitated by vanes provided on the impulse rotor generator, or on adjacent tool modules. Considering the harsh environment in which these units are used, one skilled in the art may chose suitable construction materials that also exhibit corrosion resistant properties. While a parallel arrangement for the pickup coils was described, an alternate configuration where the pickup coils are arranged in series can be implemented. While a corrosion resistant stainless steel (i.e. Nitronic 50, 304/316 grade, Aqualloy, etc.) is a preferred material for the construction of various components of the impulse rotor generator, certain components can be constructed of alternate materials. For example, for substantial cost savings, the power rotor can be formed or made using a durable polymer material (i.e. polyurethane, nylon or Delrin). As such, a used power rotor could be disposed of, instead of refurbished, thereby reducing costly maintenance requirements and decreasing downtime. It is also possible to increase or decrease the number of seals used to inhibit the ingress of drilling mud into the region of the pickup coils. The number of paddles on the power rotor can be increased or decreased in accordance with the demands for a particular application. Still further alternatives and modifications may occur to those skilled in the art. All such alternatives and modifications are believed to be within the scope of the invention as defined by the claims appended hereto.

The invention claimed is:

1. An impulse rotor generator for generating power in response to a primary mud flow in a drill string, said generator comprising:
    a power rotor,
    at least one stationary magnetic pickup,
    a pickup coil mounted on said at least one stationary magnetic pickup,
    said power rotor being positioned at least in part in said primary mud flow and being rotatable in response to said primary mud flow, said power rotor having an axis of rotation that is transverse to said primary mud flow,
    said power rotor having a plurality of magnets affixed thereto, said magnets being arranged so as to magnetically couple with the at least one stationary magnetic pickup,
    wherein upon rotation of said power rotor in response to said primary mud flow, a current is produced in said pickup coil mounted on said at least one stationary magnetic pickup.

2. The impulse rotor generator of claim 1, wherein said power rotor comprises a plurality of paddle segments.

3. The impulse rotor generator of claim 2, wherein said power rotor comprises 6 paddle segments.

4. The impulse rotor generator of claim 1, wherein said generator comprises a plurality of stationary magnetic pickups.

5. The impulse rotor generator of claim 4, wherein said generator comprises 4 stationary magnetic pickups.

6. The impulse rotor generator of claim 1, wherein at least one side of said power rotor comprises 6 magnets, arranged so as to magnetically couple with the at least one stationary magnetic pickup.

7. The impulse rotor generator of claim 6, wherein said power rotor comprises 6 paddle segments, and wherein each of said 6 magnets are associated with a respective paddle segment.

8. The impulse rotor generator of claim 1, wherein said pickup coil is housed within a canister that is positioned over said at least one stationary magnetic pickup.

9. The impulse rotor generator of claim 8, wherein said canister is provided with seals to inhibit ingress of drilling mud into the region of the pickup coil.

10. An impulse rotor generator for generating power in response to a primary mud flow in a drill string, said generator comprising:
    a pressure barrel dimensioned to form an annulus between said apparatus and said drill string, said annulus permitting the passage of said primary mud flow,
    a power rotor located at least in part in said pressure barrel, said power rotor being rotatable about an axis transverse to the longitudinal axis of the pressure barrel, said power rotor extending at least in part in said annulus, so as to rotate in response to the primary mud flow through said annulus
    said power rotor having a plurality of magnets affixed thereto, said plurality of magnets being arranged to magnetically couple with at least one adjacently positioned stationary magnetic pickup,
    said stationary magnetic pickup having mounted thereon a pickup coil in which a current in generated in response to rotation of the power rotor relative to said stationary magnetic pickup.

11. The impulse rotor generator of claim 10, wherein said power rotor comprises a plurality of paddle segments.

12. The impulse rotor generator of claim 11, wherein said power rotor comprises 6 paddle segments.

13. The impulse rotor generator of claim 10, wherein said generator comprises a plurality of stationary magnetic pickups.

14. The impulse rotor generator of claim 13, wherein said generator comprises 4 stationary magnetic pickups.

15. The impulse rotor generator of claim 10, wherein at least one side of said power rotor comprises 6 magnets, arranged so as to magnetically couple with the at least one stationary magnetic pickup.

16. The impulse rotor generator of claim 15, wherein said power rotor comprises 6 paddle segments, and wherein each of said 6 magnets are associated with a respective paddle segment.

17. The impulse rotor generator of claim 10, wherein said pickup coil is housed within a canister that is positioned over the at least one stationary magnetic pickup.

18. The impulse rotor generator of claim 17, wherein said canister is provided with seals to inhibit ingress of drilling mud into the region of the pickup coil.

19. The impulse rotor generator of claim 10, wherein said pressure barrel is configured at each end with suitable attachment facings for insertion into a drill string.

20. An impulse rotor generator for generating power in response to a primary mud flow in a drill string, said generator comprising:
    a power rotor,
    at least one stationary magnetic pickup,
    a pickup coil mounted on said at least one stationary magnetic pickup,
    said power rotor being positioned at least in part in said primary mud flow and being rotatable in response to said primary mud flow, said power rotor having an axis of rotation that is transverse to said primary mud flow,
    said power rotor having at least one section of magnetically permeable material that spans said power rotor from side to side;
    said stationary magnetic pickup having at least one magnet affixed thereto, said magnet being arranged so as to permit said stationary magnetic pickup to magnetically couple with the at least one section of magnetically permeable material spanning said power rotor;
    wherein upon rotation of said power rotor in response to said primary mud flow, a current is produced in said pickup coil mounted on said at least one stationary magnetic pickup.

* * * * *